May 8, 1951  A. S. TALLMAN  2,552,124
FIBROUS GLASS FABRIC
Filed Dec. 12, 1945
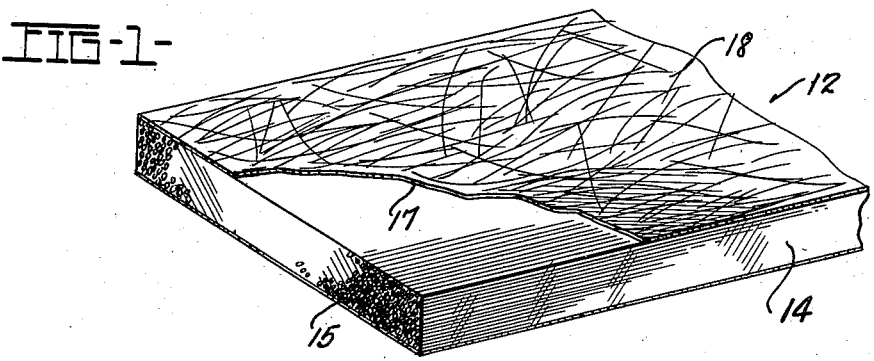
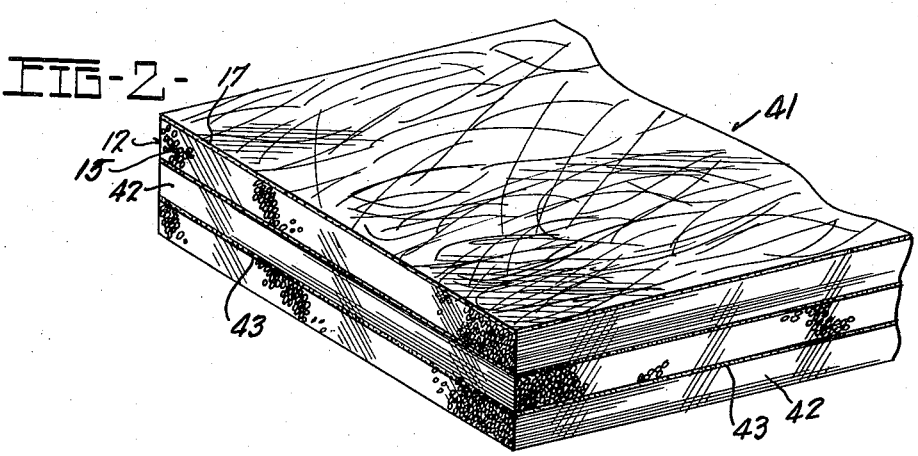
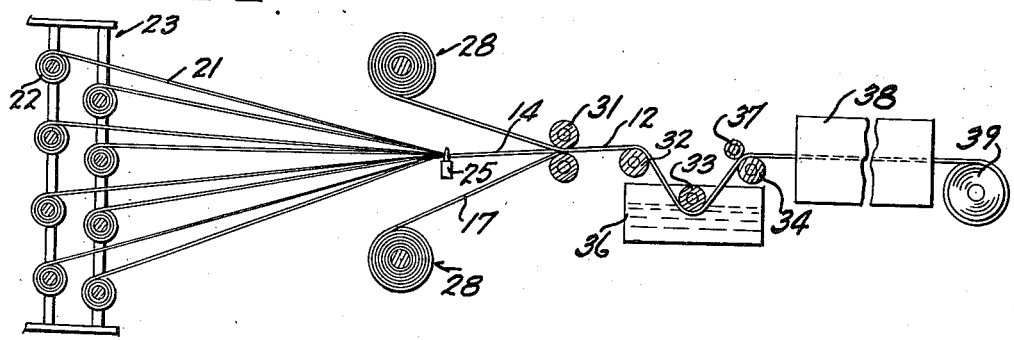
INVENTOR
ANNA S. TALLMAN
BY Staelin & Overman
ATTYS.

Patented May 8, 1951

2,552,124

UNITED STATES PATENT OFFICE 2,552,124

FIBROUS GLASS FABRIC

Anna S. Tallman, Seattle, Wash., assignor to Owens-Corning Fiberglas Corporation, a corporation of Delaware Application December 12, 1945, Serial No. 634,606

8 Claims. (Cl. 154—46)

This invention relates to fabrics and more particularly to fibrous glass fabrics for use as reinforcements for plastics.

In the manufacture of reinforced plastics, particularly plastic laminates, woven cloths are impregnated with a selected resin or plastic in solution, may then be dried, and are then laminated to obtain the thickness desired in the finished product. The laminating is done usually by laying the resin-impregnated fabrics over a mold or form upon which the laminate is held under pressure while the resin is cured by application of heat.

The use of woven cloth for the manufacture of plastic laminates and similar products results in an arrangement of the fibrous material in the plastic body that is not best adapted to utilize the full strength of the fibrous material. This is because the yarns in the interwoven cloth are looped back and forth about crossing yarns and are thus disposed in wavy configurations rather than in the straight line arrangement in which they could best resist stresses to which the reinforced plastic is subjected.

This inability to realize the full strength of the fibrous material is pronounced in the case of interwoven fabrics of fibrous glass. The yarns of glass fibers are relatively incompressible and the wavy configurations of the yarns in the fabric are therefore of more consequence.

In making plastic laminates of irregular or curved form it is necessary to cut conventional cloths to patterns and piece the cloth together when laying up the laminate so that the cloth will fit the curvature or shape of the mold or form on which the laminate is being made. If this is not done the cloth will bunch and wrinkle over the curved parts of the form or mold and make it impossible to obtain a satisfactory finished article.

Another objection to the use of conventional cloth in the manufacture of plastic laminates is that the interwoven arrangement of the yarns of the cloth necessarily introduces a certain amount of spaces or interstices between the yarns so that in the use of fabrics there is a fairly definite restriction upon the density of fibrous material that may be obtained in a reinforced plastic.

It is an object of the invention to provide a reinforcing fabric having the fibers, yarns or strands thereof all disposed in the position best to assume the loads resulting from stresses to which laminates and other composite products incorporating the fabric may be subjected.

It is another object of the present invention to provide a fabric for the manufacture of plastic laminates and other composite products of resin and fibrous material that is extensible to necessary degree to permit it to be fitted over molds and forms.

Another object of the invention is the provision of a fabric-reinforced resinous product of improved properties, increased strength, and lower cost, and that may have a high density of fibrous reinforcing material therein.

It is another object of the invention to provide a fabric in the production of which conventional weaving operations may be dispensed with.

It is a still further object of the invention to provide a fabric of fibers all extending in substantial parallelism but being laterally relatively movable while being secured together in the fabric so that the fabric may be distorted and stretched without splitting or tearing.

It is still another object of the invention to provide a fabric of parallelly related glass fibers held together into an integral sheet with the aid of means rupturable when desired to permit relative movement of the fibers and consequent deformation and stretching of the fabric.

These and other objects will be more readily understood from the following description taken in connection with the drawings, in which:

Figure 1 is an enlarged fragmentary perspective view of the fabric of the invention;

Figure 2 is a similar view of a plastic laminate incorporating the fabric of the present invention; and Figure 3 is a diagrammatic illustration of one process by which the fabric of the invention may be formed.

The fabric 12 of the invention comprises two or more superposed sheets of fibrous material of which at least one is a sheet 14 of a multiplicity of fine glass fibers arranged substantially in parallelism and substantially in lateral contact. The fibers 15 of this sheet are preferably held together in the sheet by binding material distributed throughout the sheet and received in the spaces between the fibers.

The sheet 14 of parallelly arranged fibers is faced on one and preferably both sides with a relatively thin web 17 of haphazardly arranged interlaced fibers 18. The fibers of the web are preferably held together by a small amount of binding material distributed throughout the web and the sheet 14 of parallel fibers and the web 17 are held together by a binding material interjacent the sheet and web.

The sheet of parallelly arranged fibers is formed preferably by arranging in parallelism a multiplicity of strands each containing a large number, say two to four hundred, individual glass fibers. The glass fibers are preferably of the continuous type, that is, they extend in continuous lengths throughout any given length of strand. The number of strands per inch of width of the sheet may be varied depending upon the desired thickness of the sheet 14 but are usually in number sufficient to provide substantial thickness of the sheet, that is, thicknesses ranging from about 1/64 to 1/8 of an inch. The individual fibers of the sheet are of diameters from about .00015 to .0003 inch.

The web 17 of haphazardly arranged interlaced fibers is relatively much thinner than the sheet 14 and the fibers of the web are preferably substantially smaller in diameter than the fibers of the sheet, so that the web is in the nature of a fine veil. For example, the web or veil may be about .0010 to .0025 inch in thickness and the fibers in the veil may be from about .00005 to .00009 inch in diameter. These figures are given by way of example and not as limitations since the thickness of the sheet and the veil and the diameters of the fibers of the sheet and the fibers of the veil may be varied although the relationship shown by the example should usually be adhered to.

The interlaced haphazardly arranged fibers of the veil provide a high degree of integrity which permits the veil to uniformly resist stresses applied thereto in any direction. The combination of the veil with the sheet of parallelly arranged fibers resists splitting of the sheet along lines extending in the direction of the fibers of the sheet when the fabric is subjected to stresses applied transversely to the direction of the parallelly related fibers of the sheet.

The sheet of parallelly arranged fibers may be made by winding a multiplicity of glass fibers as they are continuously attenuated onto a drum until a sheet of the desired thickness is accumulated. The annular body of fibers on the drum is then cut along a line parallel with the axis of the drum and the sheet of fibers unrolled from the drum. Selected binding material may be applied to the mat as it collects on the drum as by spraying the material onto the rotating mat or onto the fibers as they travel toward the drum.

The sheet of parallel fibers may also be formed by an operation similar to the conventional warping procedure in which a multiplicity of intertwisted yarns or untwisted strands are drawn from the spools or other packages thereof and brought into parallelism in close adjacency to form a warp. This warp may also have a binding material applied thereto by spraying a solution of the material thereon or by passing the warp through a bath of the binding material in solution.

In the case where yarns are employed for forming the sheet of parallelly arranged fibers it is desirable that the yarns be formed of a single strand having a relatively low twist, for example, one-half or one turn per inch. The yarns of this nature fairly well lose their identity when paralleled together in the sheet and provide in general effect a sheet of paralleled separate fibers, the fibers of adjacent yarns in the sheet interlacing slightly with each other to provide a sheet of high integrity.

The webs of interlaced haphazardly arranged fibers may be made by attenuating streams of glass by gaseous attenuating blasts and collecting the fibers as they are formed on a foraminous surface so that they are deposited from the blast in a haphazard interlaced arrangement.

The sheet of haphazardly arranged fibers may also be formed by subjecting a mass such as a mat of glass fibers to a conventional picking operation and then feeding the picked fibers to a gaseous blast by which they are conveyed to and deposited on a collecting surface. Instead of collecting the fibers on an ordinary collecting surface such as a conveyor, they may be deposited directly onto the sheet of parallelly arranged fibers as it is passed through the fiber deposition zone. In this operation as well as in the one previously described, a selected binding material may be sprayed onto the mat or onto the fibers as they move toward the collecting surface to bind the fibers together in the web.

The web of haphazardly arranged fibers may be formed in other ways but the deposition of the fibers onto a collecting surface by means of a gaseous blast is preferred because it presents a ready means for obtaining the required haphazard interlaced relation of the fibers.

The fabric of the present invention is made by superposing the web with the sheet of parallel fibers and securing the two together. Preferably the sheet is sandwiched between two webs of haphazardly arranged fibers but if desired only one face of the sheet may be covered with the web. Also, if desired, one or more webs of haphazardly arranged fibers may be sandwiched between a plurality of sheets of parallelly arranged fibers and this laminated fabric then in turn faced on one or both sides with webs of haphazardly arranged fibers.

One way of making the fabric of the invention is illustrated diagrammatically in Figure 3. Here untwisted strands or low twist yarns 21 of fibrous glass are drawn from spools 22 mounted on a usual warping frame 23. The strands or yarns are drawn through a comb 25 which locates all the yarns or strands in parallel and brings them together in the form of a warp or sheet 14.

Rolls 28 of the veil 17 are supported at opposite sides of the path of the sheet 14 and the veils 17 are drawn from the rolls and fed between rollers 31 to be pressed against opposite faces of the warp 14. The fabric 12 resulting from combining the sheet 14 and the veils 17 then passes over rolls 32, 33, 34. The roll 33 is located beneath the surface of a solution of binding material contained in a tank 36 so that the fabric as it passes over the roll 33 is impregnated with the binding material. A roller 37 cooperates with the roller 34 to squeeze excess solution from the fabric.

The binder impregnated fabric may then be passed through an oven 38 in which the binder is dried or cured prior to its being rolled up into a roll 39.

The fabric made in this way is highly suited to the manufacture of plastic laminates and other reinforced resinous articles since it provides the high density of fibrous material and the great strength achieved from the presence of the sheet of compactly arranged parallel glass fibers while the veils of haphazardly arranged fibers not only increase the integrity of the fabric and prevent tearing or splitting thereof during handling and transportation but also is of such thickness as not to appreciably detract from the compact relation of the parallel fibers and the consequent overall high density of the laminate.

Various binding materials may be employed for securing the fibers together in the sheet and for securing the fibers together in the veil and for holding the veils and sheets together. Materials such as starch, resins, gelatin, and the like may be used. Favorable results are obtained by the use of a small amount of thermosetting resin such as phenol formaldehyde, urea formaldehyde or other similar resins.

The binding material is applied as previously mentioned and in a solution or emulsion of concentration providing a proportion of binding material in the finished fabric ranging from about 2 to 10% by weight of the fibers. The amount of binding material is not critical and other proportions may be employed to suit special conditions.

The binding material is preferably one that when dried or cured will not have any adverse effect upon the cure of the laminating resins to be subsequently applied to the fabric or on the adhesion of the laminating resins to the fibers of the fabric. If desired, the binding material may be a resin of the same general type as that employed as a laminating material. For instance, the binding material and the laminating resin both may be phenolic resins, ureaaldehyde resins, allyl type resin, or the like, although this is not generally necessary where the binding material is cured prior to application of the laminating resin. Also, the binding material may be a thermoplastic resin compatible with the thermosetting laminating resin. Thus vinyl copolymer resin may be used as the binding material when ordinary low pressure thermosetting resins such as allyl alkyd resin, polyester resins, styrene reacted polyester resins, modified phenolic resins, and high pressure phenolic resins are employed as laminating resins.

The binding material may also be treated prior to application of the laminating resin to render it compatible with the laminating resin or to otherwise improve the adhesion of the laminating resin to the fiber surfaces through the agency of the treated binding material. For instance, when starch is employed as the binding material in the fabric, the fabric may be heat treated at temperatures from about 200 to 250° C. for several minutes to one-half hour to convert the starch to a caramelized condition which, it has been found, improves the adhesion of conventional laminating resins to the fibers.

When the fabric of the present invention is impregnated with conventional laminating resins in the manufacture of plastic laminates and similar products, sufficient laminating resin is ordinarily applied to the fabric to fill all interstices between the fibers and to form a substantially continuous, void-free body of resin in which the fabric is incorporated. After the resin is applied to the fabric the fabric may be air dried to drive out the solvent that was included in the resin solution. After this treatment the impregnating resin is somewhat plastic or will become plastic upon the application of heat. As a result, the fabric may be deformed when it is laid up in a mold or over a form in the manufacture of a reinforced plastic article so that the fabric will adapt itself to the shape of the mold. This shaping of the fabric to fit the mold is greatly facilitated in the present case because the fabric will readily extend or stretch in directions transverse to the direction of the parallel fibers in the sheet 14.

This extension of the fabric is permitted by the relatively weak bond between the individual fibers provided by the small amount of binding material. The veil of fibers deforms and stretches along with the sheet of arallel fibers due also to the weak bond of the fibers of the veil and also to the fact that the fibers of the veil are extremely fine and therefore the individual fibers are relatively easily broken. The presence of the laminating resin in a flowable, deformable state during this stretching of the fabric permits the relative movement of the fibers of the sheet and of the veil while still adhesively securing the fibers together and preventing separation of the sheet from the veil and also complete parting of the sheet along lines parallel with the direction of the fibers in the sheet 14.

Throughout all handling of the fabric, the fibers of the veil serve to tie together the fibers of the sheet 14 and thus prevent splitting of the fabric. At the same time the fibers of the veil are so fine and present in such small amounts as not to detract from the high density of fibrous glass obtained in the finished laminate by virtue of the parallelly arranged glass fibers of the sheet 14.

In place of or in addition to the small amount of binding material applied to the fabric as previously mentioned, there may be applied to the parallel fibers of the sheet and, if desired, also to the fibers of the veil prior to the combining of the sheet and veil into the fabric, or to the sheet and veil after such combination, a laminating resin in a partially cured plastic state. The resin should be sufficiently viscous so that it will not run off the fabric but should also have a definite plastic stage that will exist for a fair length of time so that it does not harden before the fabric can be laid up as a laminate.

Conventional laminating resins such as phenol formaldehyde, urea formaldehyde or melamine resins, may thus be applied to the fabric at the time it is made, as well as the low pressure forming resins, for example, low pressure phenolic resins, allyl resins, allyl alkyd resins, polyester resins, styrene reacted polyester resins and others.

In the manufacture of reinforced resinous articles such as plastic laminates, the fabric of the present invention impregnated with a partially cured resin in a plastic condition, is cut to the desired size and pattern and the pieces superposed on the mold or form to the required thickness. In fitting the pieces of the fabric to the mold the fabric may be distorted and stretched due to the relative movement of the fibers of the fabric permitted by their being held together by the plastic deformable impregnant while tearing or splitting of the fabric is resisted by the thin webs of interlaced haphazardly arranged fibers disposed over one or both faces of the fabric. The laminate after it is laid up is subjected to heat and pressure in the conventional manner for converting the resin to a hard infusible state. The resulting finished product normally is a body 41 comprising a continuous body of resin throughout which the fibrous material is distributed in the form of a plurality of layers 42 of parallelly arranged fibers, with interjacent relatively very thin layers 43 of finer haphazardly arranged fibers. The laminated body 41 shown in Figure 2 is made up of the fabric 12 of the invention in which the sheet 14 of parallelly arranged fibers is faced only on one side with the veil 17 of haphazardly arranged fine fibers.

Various modifications may be made within the spirit of the invention and the scope of the claims.

I claim:

1. As an article of manufacture, a composite product comprising a continuous body of a resinous material convertible to a rigid, infusible state and fibrous material distributed through the resinous material as a discontinuous phase, the product being substantially free of voids, said fibrous material being in the form of a plurality of sheets of glass fibers, the fibers in each sheet being parallelly arranged with respect to each other along their lengths, and a web of haphazardly arranged interlaced glass fibers overlying at least one face of said sheet, the diameter of the fibers of the sheet being about 0.00015 to 0.0003 inch, and the diameter of the fibers of the web being about 0.00005 to 0.00009 inch, the small diameter of said web fibers permitting breakage thereof when said sheet is stretched.

2. As an article of manufacture, a composite product comprising a continuous body of a rigid, infusible resinous material and fibrous material distributed through the resinous material as a discontinuous phase, the product being substantially free of voids, said fibrous material being in the form of a plurality of sheets of glass fibers, the fibers in each sheet being parallelly arranged with respect to each other along their lengths, and a web of haphazardly arranged interlaced glass fibers overlying at least one face of said sheet, said web being substantially thinner than said sheet and the fibers of said web being substantially finer than the fibers of said sheet.

3. A fabric comprising a sheet composed of a multiplicity of glass fibers in which the fibers are arranged in parallelism with each other along their lengths, a web of haphazardly arranged interlaced glass fibers overlying at least one face of said sheet and yieldably supporting it against the tendency to split when subjected to lateral stresses, a deformable adhesive bonding said web and sheet together, the fibers of said web being about one-seventh to one-half the diameter of the fibers of the sheet, and the web being substantially thinner than the sheet.

4. As a product of manufacture, a fabric comprising a laterally stretchable sheet of glass fibers with the fibers arranged in parallelism with each other along their lengths with the individual fibers extending substantially continuously throughout a major dimension of the sheet, a relatively thin web of haphazardly related interlaced glass fibers overlying a face of the sheet, the fibers of said web being about one-seventh to one-half the diameter of the fibers of the sheet, and a binding material distributed through the sheet and web and bonding the fibers together.

5. A fabric comprising a sheet of a multiplicity of glass fiber strands arranged in parallelism with each other along their lengths and a web of haphazardly related interlaced glass fibers overlying at least one face of said sheet and yieldably supporting it against the tendency to split when subjected to stresses, and a binding material distributed through the sheet and bonding the fibers together, said bonding material being plastic and deformable to sufficient extent that the individual parallelly arranged fibers of the sheet have substantial lateral movement relative to each other.

6. A fabric comprising a laterally stretchable sheet of a multiplicity of glass fibers arranged in parallelism with each other along their lengths and a web of haphazardly related interlaced glass fibers overlying a face of said sheet to aid in holding the parallelly arranged fibers of the sheet together, and a resin convertible to a hard infusible state distributed through the sheet and web in quantities sufficient to at least fill substantially all voids between the fibers in the fabric and bonding the fibers together, said resin being plastic and deformable to sufficient extent that the individual fibers of the sheet have substantial movement relative to each other.

7. As an article of manufacture, a composite product comprising a continuous body of an uncured, deformable resinous material and fibrous material distributed through the resinous material as a discontinuous phase, the product being substantially free of voids, said fibrous material being in the form of a plurality of sheets of glass fibers, the fibers in each sheet being parallelly arranged with respect to each other along their lengths, and a web of glass fibers interjacent said sheets with the fibers of the web being haphazardly arranged and interlaced with each other.

8. As an article of manufacture, a composite product comprising a continuous body of an uncured, potentially deformable resinous material and fibrous material distributed through the resinous material as a discontinuous phase, the product being substantially free of voids, said fibrous material being in the form of a plurality of sheets of glass fibers with the fibers in each sheet being parallelly arranged with respect to each other along their lengths, and a web of haphazardly arranged interlaced glass fibers interjacent said sheets, said web being substantially thinner than said sheets and the fibers of said web being substantially finer than the fibers of said sheets.

ANNA S. TALLMAN.

REFERENCES CITED

The following references are of record in the file of this patent:

UNITED STATES PATENTS

| Number | Name | Date |
| --- | --- | --- |
| 1,355,265 | Respess | Oct. 12, 1920 |
| 2,160,001 | Saborsky | May 30, 1939 |
| 2,206,059 | Slayter | July 2, 1940 |
| 2,339,431 | Slayter | Jan. 18, 1944 |
| 2,354,110 | Ford | July 18, 1944 |
| 2,428,654 | Collins | Oct. 7, 1947 |

OTHER REFERENCES

Modern Plastics, May 1944, "Forms, properties and handling of glass reinforcements" by Games Slayter—4 pages.